(12) United States Patent
Bachheibl et al.

(10) Patent No.: US 11,264,853 B2
(45) Date of Patent: Mar. 1, 2022

(54) ELECTRIC MACHINE HAVING A STATOR WITH MAGNETIC POLES OF VARIOUS CIRCUMFERENTIAL EXTENTS

(71) Applicant: MOLABO GmbH, Ottobrunn (DE)

(72) Inventors: Florian Bachheibl, Munich (DE); Adrian Patzak, Munich (DE)

(73) Assignee: MOLABO GmbH, Ottobrunn (DE)

( * ) Notice: Subject to any disclaimer, the term of this patent is extended or adjusted under 35 U.S.C. 154(b) by 0 days.

(21) Appl. No.: 16/472,164

(22) PCT Filed: Dec. 13, 2017

(86) PCT No.: PCT/EP2017/082684
§ 371 (c)(1),
(2) Date: Jun. 20, 2019

(87) PCT Pub. No.: WO2018/114537
PCT Pub. Date: Jun. 28, 2018

(65) Prior Publication Data
US 2019/0348883 A1 Nov. 14, 2019

(30) Foreign Application Priority Data
Dec. 21, 2016 (EP) .................................... 16205839

(51) Int. Cl.
*H02K 3/16* (2006.01)
*H02K 1/16* (2006.01)
(Continued)

(52) U.S. Cl.
CPC ................. *H02K 3/16* (2013.01); *H02K 1/16* (2013.01); *H02K 1/18* (2013.01); *H02K 1/27* (2013.01);
(Continued)

(58) Field of Classification Search
CPC ............ H02K 1/16; H02K 1/27; H02K 1/278; H02K 3/16; H02K 2201/03
(Continued)

(56) References Cited

U.S. PATENT DOCUMENTS

| 6,274,960 B1 | 8/2001 | Sakai et al. | |
| 7,352,099 B2 * | 4/2008 | Schunk | H02K 1/146 310/216.004 |

(Continued)

FOREIGN PATENT DOCUMENTS

| CN | 1213208 A | 4/1999 |
| CN | 1269624 A | 10/2000 |

(Continued)

OTHER PUBLICATIONS

Dajaku, Gurakuq et al.: "Intelligent Stator Cage Winding for Automotive Traction Electric Machines", EVS28 International Electric Vehicle Symposium and Exhibition, May 6, 2015, XP055361580.

*Primary Examiner* — Tulsidas C Patel
*Assistant Examiner* — Rashad H Johnson
(74) *Attorney, Agent, or Firm* — Morgan, Lewis & Bockius LLP

(57) ABSTRACT

An electric machine (10) comprises a stator (11), which comprises at least two slots (12) in which each at least one electrically conductive bar (13) is arranged, respectively. The stator (11) is adjacent to an air gap (14) and the at least two electrically conductive bars (13) form an electric winding (15) of the stator (11) and are arranged to be supplied with a corresponding electrical phase (n), respectively, by a power supply (16). Furthermore, the stator (11) is arranged in such a way that during operation of the electric machine (10) a stator magnetic field with at least two magnetic poles is formed in the air gap (14), where at least a first pole (22) has a circumferential extent along the air gap (14) which is (Continued)

Figure 1A:
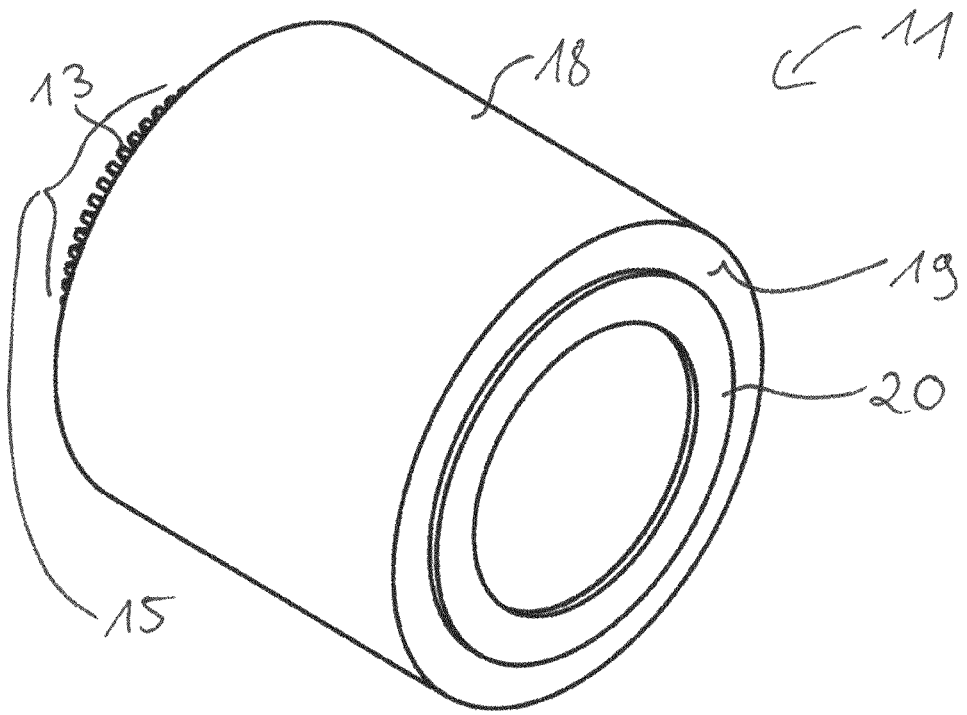

different from the circumferential extent of at least a second pole (23).

9 Claims, 11 Drawing Sheets

(51) Int. Cl.
- H02K 1/18 (2006.01)
- H02K 1/278 (2022.01)
- H02K 1/27 (2022.01)
- H02K 3/18 (2006.01)

(52) U.S. Cl.
CPC .............. *H02K 1/278* (2013.01); *H02K 3/18* (2013.01); *H02K 2201/03* (2013.01)

(58) Field of Classification Search
USPC ............ 310/156.01, 156.25, 156.36, 156.37, 310/156.39, 156.53, 156.81, 198
See application file for complete search history.

(56) References Cited

U.S. PATENT DOCUMENTS

| | | | | |
|---|---|---|---|---|
| 7,550,892 | B2* | 6/2009 | Hsu ................. | H02K 1/165 310/180 |
| 7,948,137 | B2* | 5/2011 | Ohyama ............ | H02K 1/276 310/156.53 |
| 9,906,107 | B2* | 2/2018 | Yamada ............. | H02K 19/12 |
| 2007/0040466 | A1 | 2/2007 | Vollmer | |
| 2009/0108699 | A1* | 4/2009 | Li ...................... | H02K 29/03 310/216.009 |
| 2009/0134734 | A1 | 5/2009 | Nashiki | |
| 2011/0031843 | A1 | 2/2011 | Liang et al. | |
| 2012/0235615 | A1 | 9/2012 | Nashiki | |
| 2013/0049513 | A1* | 2/2013 | El-Refaie .......... | H02K 21/16 310/156.43 |
| 2013/0200743 | A1* | 8/2013 | Okimitsu ........... | H02K 3/12 310/201 |
| 2014/0021821 | A1* | 1/2014 | Jensen .............. | H02K 21/46 310/156.83 |
| 2014/0285057 | A1* | 9/2014 | Aoyama ............ | H02K 3/28 310/210 |
| 2015/0303747 | A1 | 10/2015 | McElveen et al. | |
| 2016/0173019 | A1* | 6/2016 | Dajaku ............. | H02P 27/04 318/498 |
| 2019/0036399 | A1* | 1/2019 | Yamada ............ | H02K 3/28 |

FOREIGN PATENT DOCUMENTS

| | | |
|---|---|---|
| CN | 1458734 A | 11/2003 |
| CN | 1702946 A | 11/2005 |
| CN | 101026318 A | 8/2007 |
| CN | 201910684 U | 7/2011 |
| CN | 105703686 A | 6/2016 |
| CN | 106233583 A | 12/2016 |
| EP | 0905858 A1 | 3/1999 |
| JP | 2010045932 A | 2/2010 |
| JP | 5556037 B2 | 10/2010 |

* cited by examiner

ELECTRIC MACHINE HAVING A STATOR WITH MAGNETIC POLES OF VARIOUS CIRCUMFERENTIAL EXTENTS

The present invention relates to an electric machine with a stator and a rotor mounted movable relative to said stator.

Electric machines can be operated as a motor or a generator. The stator comprises an electric winding, which can be formed by bars arranged in slots in the stator where the bars comprise an electrically conductive material. The winding is connected to a power supply, which often has multiple phases.

If the electric machine is operated as a motor a stator magnetic field is formed in an air gap between the stator and the rotor by supplying the electric windings of the stator with different electrical phases by the power supply. The stator magnetic field changes with time such that a rotating magnetic field is formed. The stator magnetic field comprises several magnetic poles. In the rotor a rotor magnetic field is formed which interacts with the stator magnetic field. During operation of the electric machine torque is exerted on the rotor by the stator magnetic field and the rotor moves relative to the stator.

However, for electric machines the power conversion efficiency is usually not optimized for all operating points of the electric machine. For example, the power conversion efficiency might not be optimized if the electric machine is operated in partial load.

It is an objective to provide an electric machine with an increased efficiency.

This objective is solved by the independent claims. Further embodiments are the subject of dependent claims.

In one embodiment of the electric machine the electric machine comprises a stator which comprises at least two slots. In the slots at least one electrically conductive bar is arranged, respectively. It is possible that the stator comprises a plurality of slots. The stator can further be formed by a plurality of iron sheets in which the slots are formed. It is also possible that several bars or different electrically conductive materials are arranged within a slot.

In a preferred embodiment in each slot exactly one bar is arranged.

In another preferred embodiment the bars have a straight design. As a result, both the production of the slots and the production of the bars are simplified. The bars can comprise aluminum or copper. The slots can be arranged equidistant around the perimeter of the stator and the slots can be parallel to each other. The bars are electrically connected to one another at a first side of the stator so that they produce a short circuit with one another.

Furthermore, the stator is adjacent to an air gap. It is also possible that the air gap is arranged between the stator and a rotor of the electric machine.

The at least two electrically conductive bars form an electric winding of the stator and are arranged to be supplied with a corresponding electrical phase, respectively, by a power supply. This means, the winding of the stator comprises at least two electrical phases which are formed by the bars. Preferably, the electric machine comprises multiple electrical phases. Each bar can be supplied with an individual phase current, respectively. The phase currents can be shifted time-wise towards each other such that a rotating magnetic field can be formed in the air gap. The sum of all phase currents is equal to zero in order to avoid leakage currents in the power supply.

The stator can be arranged similar to a squirrel cage rotor where the bars form a short circuit only on a first side of the stator, for example by forming a short circuit ring. At a second side of the stator which faces away from the first side the bars are each electrically connected with the power supply. Thus, the bars in the slots can be controlled individually or in groups by the power supply with a respective electrical phase.

The stator is arranged in such a way that during operation of the electric machine a stator magnetic field with at least two magnetic poles is formed in the air gap, where at least a first pole has a circumferential extent along the air gap which is different from the circumferential extent of at least a second pole. During operation of the electric machine the bars of the winding of the stator are supplied with individual phase currents by the power supply. In this way the rotating stator magnetic field is formed in the air gap. As the phase currents are time-wise phase shifted towards each other, magnetic poles of the stator magnetic field are formed in the air gap which rotate along the air gap. If a rotor of the electric machine can interact with the stator magnetic field, torque can be exerted on the rotor. As the electric machine comprises at least two slots with electrically conductive bars the stator magnetic field comprises at least the first pole and the second pole.

The circumferential extent of a magnetic pole is given along the perimeter of the air gap. The circumferential extent can therefore be a geometrical extent along the perimeter of the air gap.

In a preferred embodiment the stator has a circular shaped cross section. Thus, also the cross section through the air gap can be circular shaped. In this case, the circumferential extent of the magnetic poles can also be given by an angular extent. An angular extent is given within a cross section through the stator for a central angle of the cross section. This means, each magnetic pole extends within a certain angle range within a cross section through the stator. The angle range is measured as the opening angle of a segment of the circle in which the respective pole extends.

The circumferential extent of the first pole can be larger than the circumferential extent of the second pole. It is also possible that the circumferential extent of the first pole is smaller than the circumferential extent of the second pole. Similarly, also the angular extent of the first pole can be either larger or smaller than the angular extent of the second pole.

For synchronous electric machines the circumferential extents of the magnetic poles of the stator magnetic field can be chosen in such a way that a rotor magnetic field can interact with the stator magnetic field such that torque is exerted on the rotor. This means, the circumferential extents of the poles of the stator magnetic field are chosen in such a way that for each pole of the rotor magnetic field the stator magnetic field comprises a pole with the same angular extent.

For asynchronous electric machines, also called induction machines, the circumferential extents of the magnetic poles of the stator magnetic field can be changed during the operation of the electric machine since the rotor magnetic field can interact with different stator magnetic fields.

Advantageously, the circumferential extents of the poles of the rotor magnetic field and the stator magnetic field can be chosen in such a way that the electric machine is optimized for different operation modes. For example, the electric machine can be optimized for different partial load conditions. This means, the electric machine can be optimized for an increased power conversion efficiency or for an increased torque.

Furthermore, the difference of the circumferential extents of the first and the second pole is advantageous for a measurement of an angular position of the rotor or the motor speed. The angular position of the rotor gives the position of the rotor with respect to the stator. For small motor speeds the angular position of the rotor can be determined without a sensor, for example by measuring the inductance of the electric winding of the stator by applying high-frequency currents and comparing the measured values to a look-up table. For larger motor speeds the angular position of the rotor can be determined by measuring the voltage which is induced in the winding of the stator during operation of the electric machine. In both cases the accuracy of determining the angular position of the rotor depends on the circumferential extent of the poles of the stator magnetic field. The angular position of the rotor can be determined with a higher accuracy if a larger number of bars in the stator contributes to the formation of a pole of the stator magnetic field. Thus, with at least one first pole having a larger circumferential extent than at least one second pole, the angular position of the rotor and the motor speed can be determined with an increased accuracy in comparison to an electric machine where all poles exhibit the same circumferential extents.

In one embodiment of the electric machine the at least two poles have a respective pole width which is equal to their circumferential extents along the air gap. This means, the respective pole widths also correspond to the angular extents of the poles.

In one embodiment of the electric machine the stator magnetic field is a rotating field. The electrical phases can be time-wise shifted towards each other such that the rotating stator magnetic field is formed in the air gap. During operation of the electric machine torque is exerted on the rotor by the stator magnetic field and the rotor moves relative to the stator.

In one embodiment of the electric machine the electric machine comprises at least one further slot in the stator, in which at least one further electrically conductive bar is arranged, where at least one third pole of the stator magnetic field has the same circumferential extent along the air gap as the first pole. The circumferential extents of the first and the third pole can thus either be larger or smaller than the circumferential extent of the second pole.

In one embodiment of the electric machine the first and the third pole are arranged symmetrically with respect to a center of a cross section through the stator. Preferably, the cross section of the stator is circular shaped and the cross section comprises a center in the center of the circle. This means, the first and the third pole can be arranged on opposing sides of the circle within the cross section through the stator. It is also possible that the electric machine comprises a fourth pole which has the same circumferential extent along the air gap as the second pole. In that case the second and the fourth pole can also be arranged symmetrically with respect to the center of the cross section through the stator. In another embodiment it is also possible that the electric machine comprises several first and third poles which are arranged symmetrically with respect to the center of the cross section through the stator.

In one embodiment of the electric machine the air gap is arranged between the stator and a rotor which is mounted movable relative to the stator. The stator and the rotor are both adjacent to the air gap such that the air gap is arranged between the rotor and the stator. The rotor can be arranged within the stator or around the stator. The rotor can be an asynchronously operating induction rotor or a synchronous rotor.

In one embodiment of the electric machine a rotor magnetic field with magnetic poles is formed in the rotor during operation of the electric machine where the poles exhibit the same angular extents as the poles of the stator magnetic field in the air gap where the angular extents refer to central angles of a cross section through the rotor. The rotor can for example comprise permanent magnets which form the rotor magnetic field with several poles. It is also possible that the rotor is a squirrel cage rotor where the rotor magnetic field is induced by the stator magnetic field during operation of the electric machine. Preferably, the cross section of the rotor is circular shaped. In this case angular extents of the poles for central angles of the circle can be given. This means, each pole extends over a certain angle range of the circle.

Since the cross section of the stator is preferably also circular shaped, the angular extents of the poles of the rotor magnetic field extend along the same central angles of the cross section as the poles of the stator magnetic field. This means the geometric size of the poles of the stator magnetic field can be different from the geometric size of the poles of the rotor magnetic field, however, for each pole of the stator magnetic field the rotor magnetic field comprises a pole with the same angular extent.

If the rotor magnetic field is formed by permanent magnets in the rotor the number of the poles of the rotor magnetic field is given by the number of the permanent magnets in the rotor. The angular extents of the poles of the rotor magnetic field can in this case be changed by changing the geometric size of the permanent magnets.

In one embodiment of the electric machine the rotor is a squirrel cage rotor. This means the rotor comprises slots in which electrically conductive bars are arranged where the bars form an electrical winding of the rotor. The bars are electrically connected at both sides of the rotor by short circuit rings and they can comprise aluminum or copper. In this embodiment the number and the angular extents of the poles of the rotor magnetic field can be changed during operation of the electric machine.

In one embodiment of the electric machine the rotor is one of a rotor with buried permanent magnets, a rotor with surface mounted permanent magnets, a synchronous reluctance rotor, an externally excited synchronous rotor. In the case of a rotor with permanent magnets the number of the poles of the rotor magnetic field is given by the number of magnetic poles of the rotor and it cannot be changed during operation of the electric machine. In the case of the rotor with buried permanent magnets the permanent magnets can be arranged in different shapes within the rotor, for example v-shaped or as spokes.

In one embodiment of the electric machine the rotor is a combination of at least two of a rotor with buried permanent magnets, a rotor with surface mounted permanent magnets, a synchronous reluctance rotor, an externally excited synchronous rotor, a squirrel cage rotor. This means the poles of the rotor magnetic field can for example be formed by permanent magnets and parts of a winding of a squirrel cage rotor. It is also possible to combine other types of rotors and it is further possible to combine more than two types of rotors. The different poles can be arranged either symmetrical or asymmetrical around the center through a cross section of the rotor.

In one embodiment of the electric machine the stator magnetic field is formed by supplying the bars of the stator with a corresponding electrical phase each during operation of the electric machine. The electrical phases can be time-wise shifted towards each other such that the rotating stator magnetic field is formed in the air gap. By supplying the bars of the stator with a corresponding electrical phase it is possible to form the stator magnetic field with poles where the circumferential extent of the poles can be changed by changing the phase currents of the bars. Therefore, the number and the circumferential extents of the poles of the stator magnetic field can be adapted to the number and circumferential extents of the poles of the rotor magnetic field during operation of the electric machine.

The feature that the circumferential extent and the number of the poles of the stator magnetic field can be changed during operation of the electric machine is realized by forming the electric winding of the stator with the bars arranged in the slots of the stator and supplying each bar with an individual phase current by means of the power supply. If the stator magnetic field was formed by permanent magnets or by an electrical winding where the pole widths of the stator magnetic field cannot be adapted during operation of the electric machine, it would not be possible to adapt the stator magnetic field to the properties of the rotor magnetic field.

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

In FIG. 1A an exemplary embodiment of a stator of the electric machine is shown.

Figure 1B:
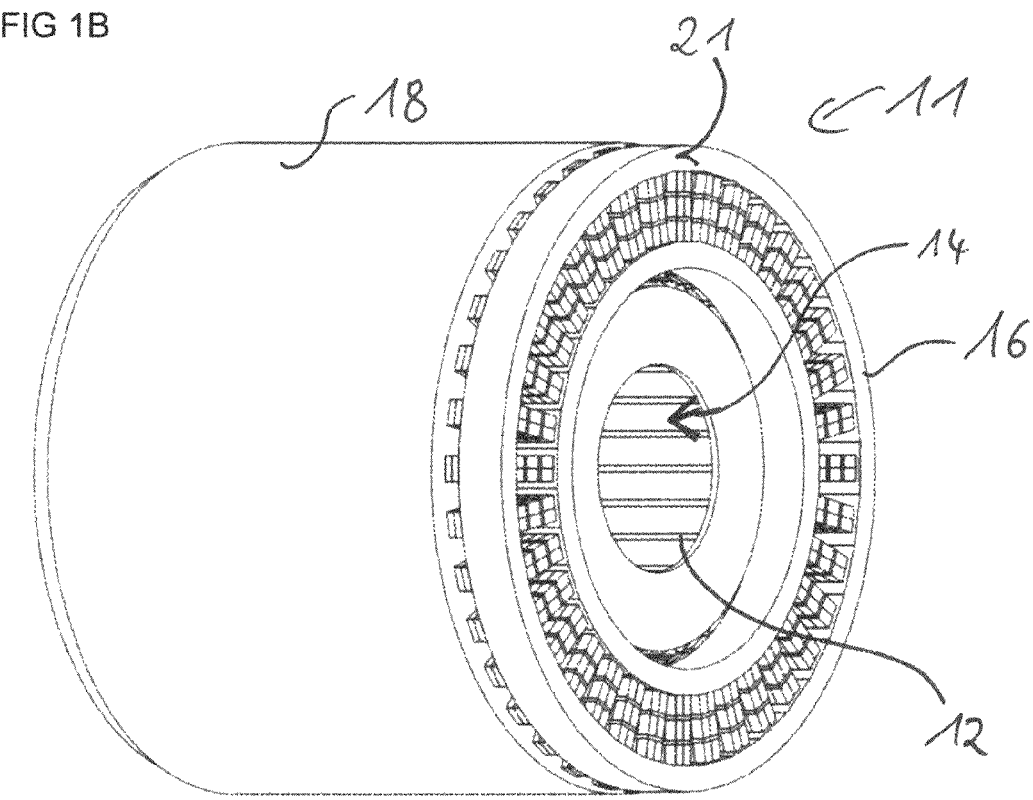

In FIG. 1B an exemplary embodiment of a stator connected to a power supply is shown.

Figure 2A:
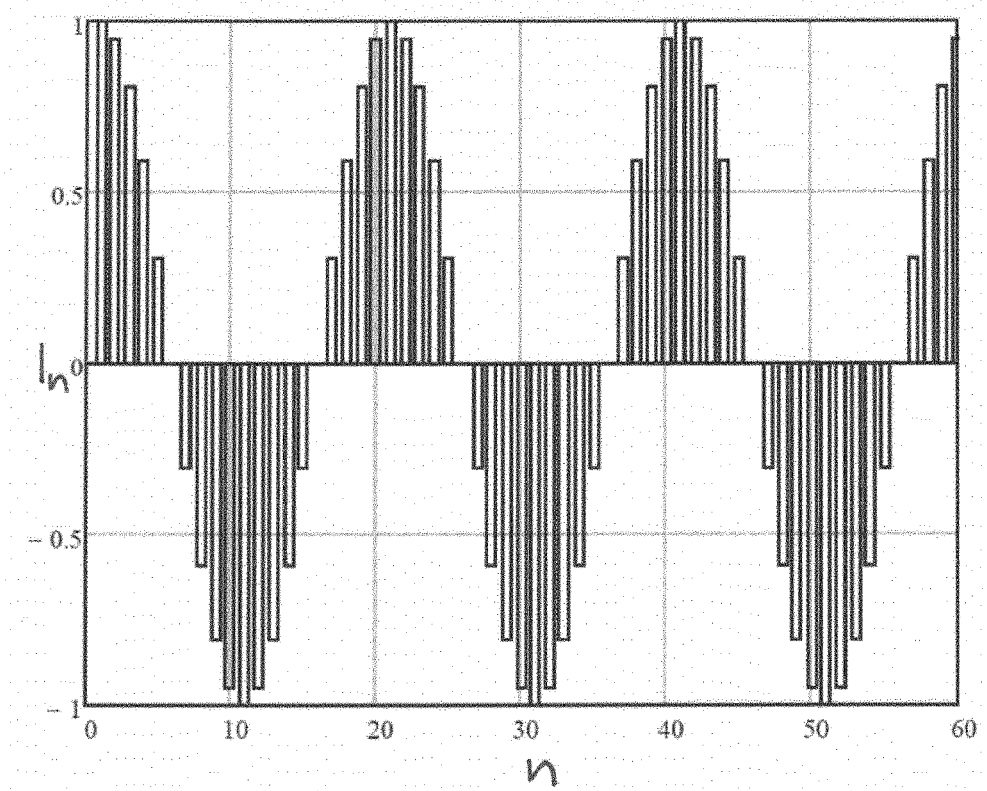
Figure 2B:
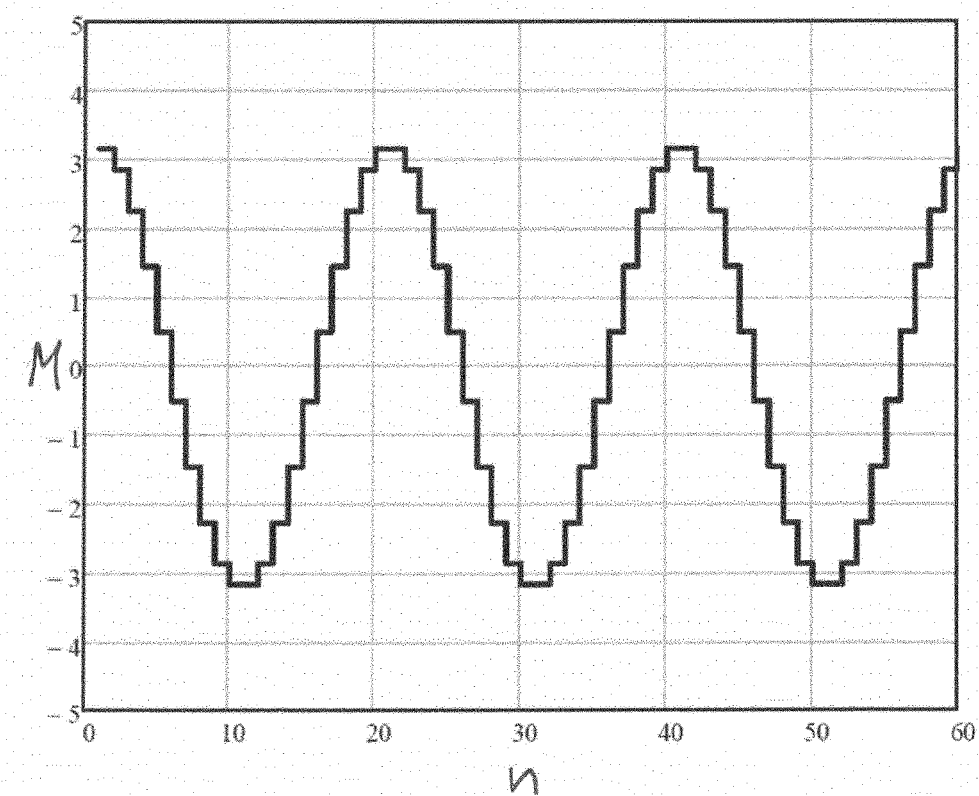

In FIGS. 2A and 2B exemplary phase currents and the resulting magneto motive force of the stator are shown.

Figure 2C:
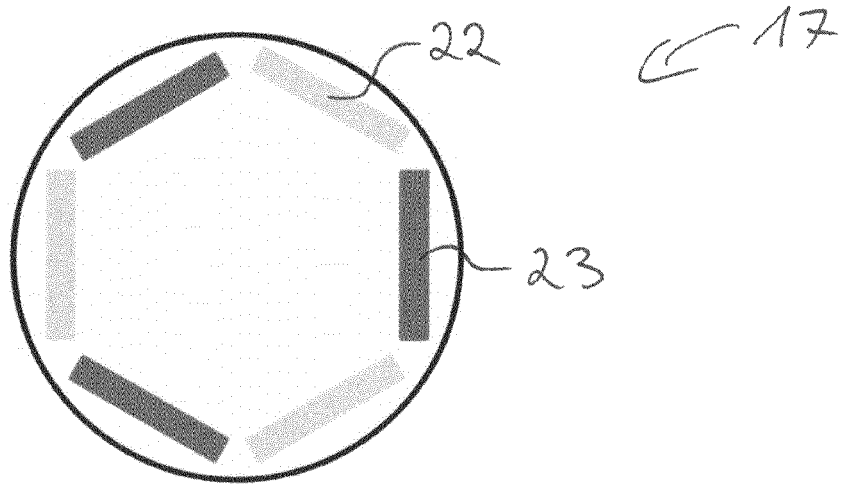
Figure 2D:
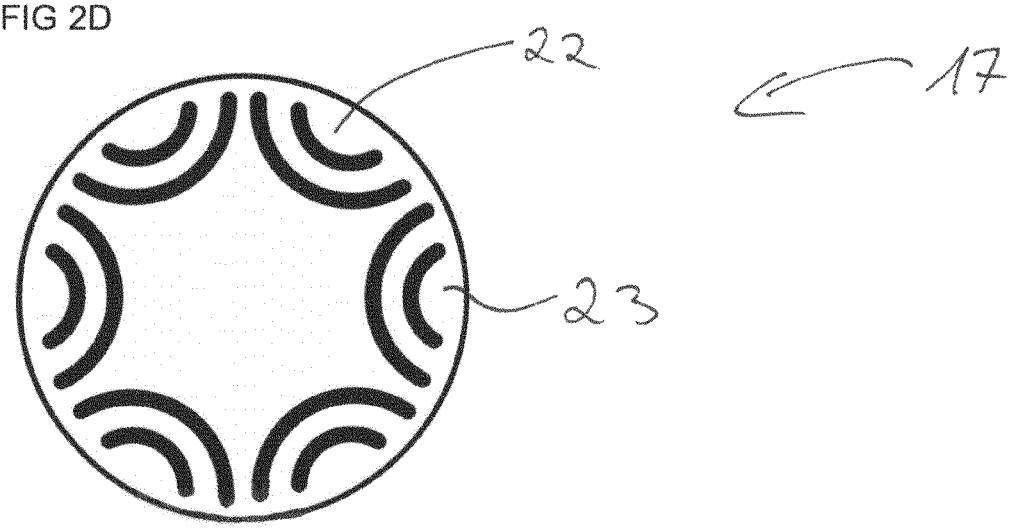
Figure 2E:
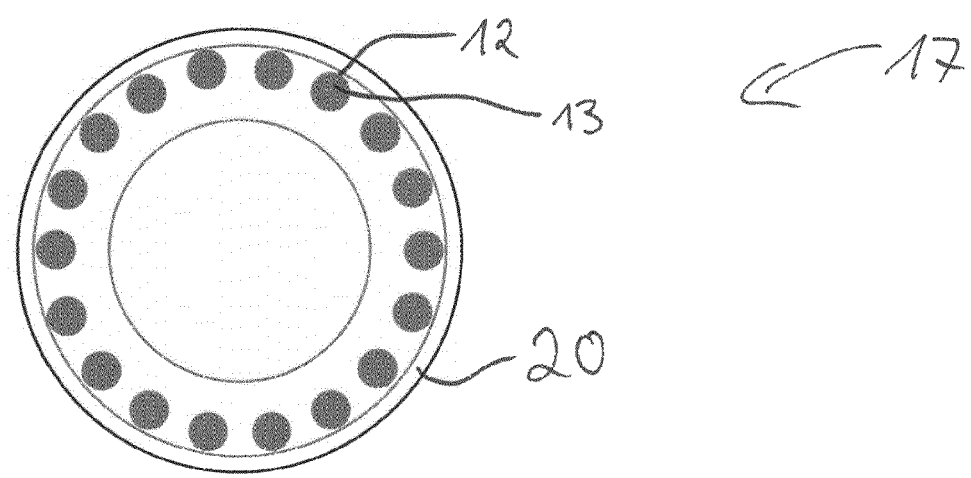

In FIGS. 2C to 2E cross sections through different rotors are shown.

Figure 3A:
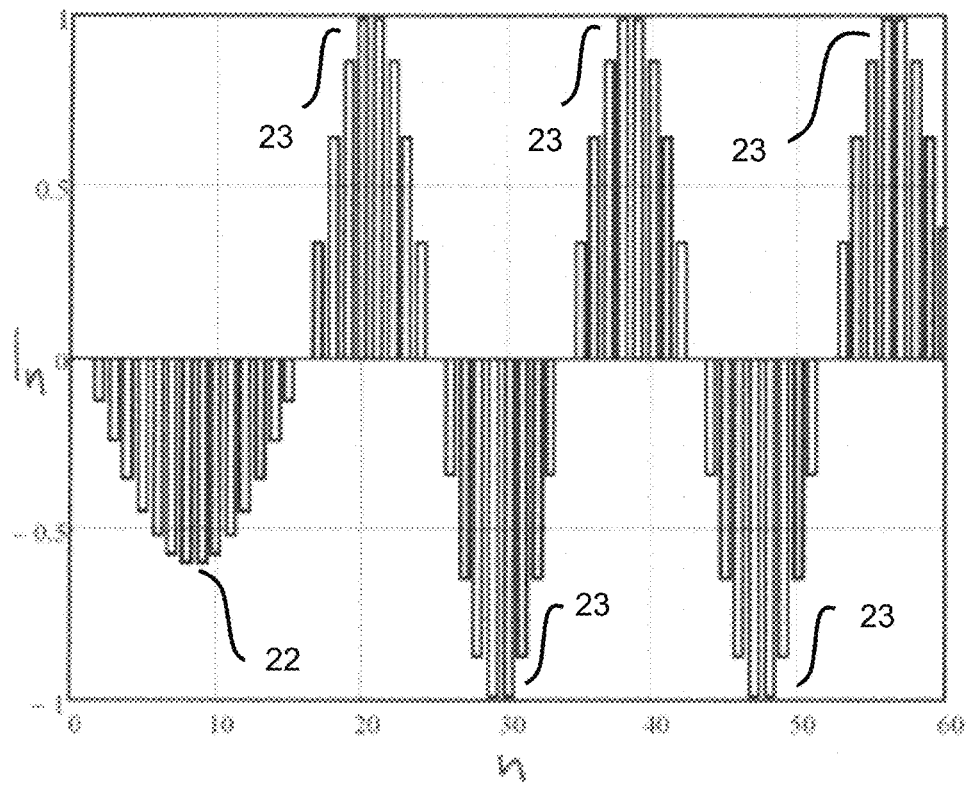
Figure 3B:
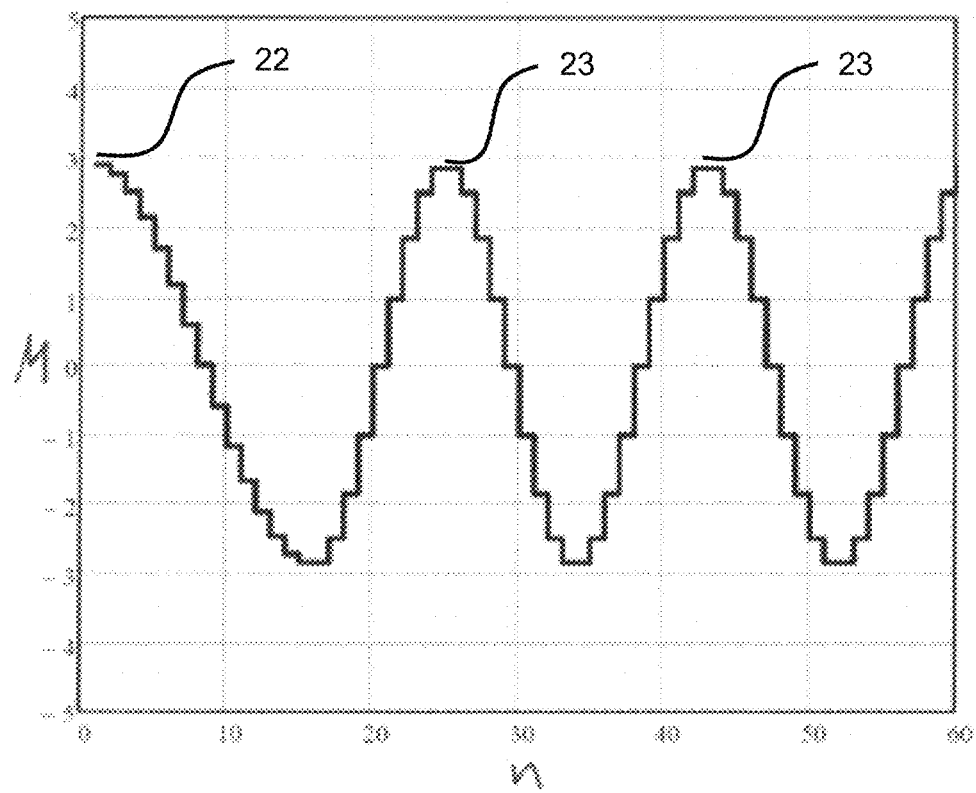

In FIGS. 3A and 3B exemplary phase currents and the resulting magneto motive force for an exemplary embodiment of the stator are shown.

Figure 3C:
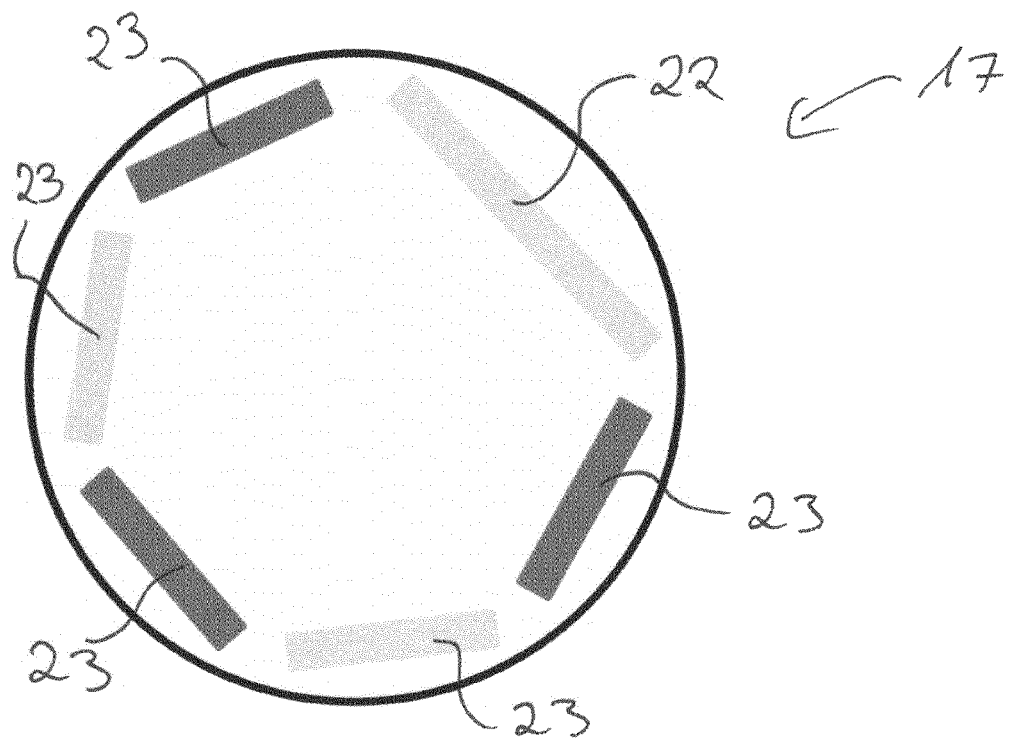
Figure 3D:
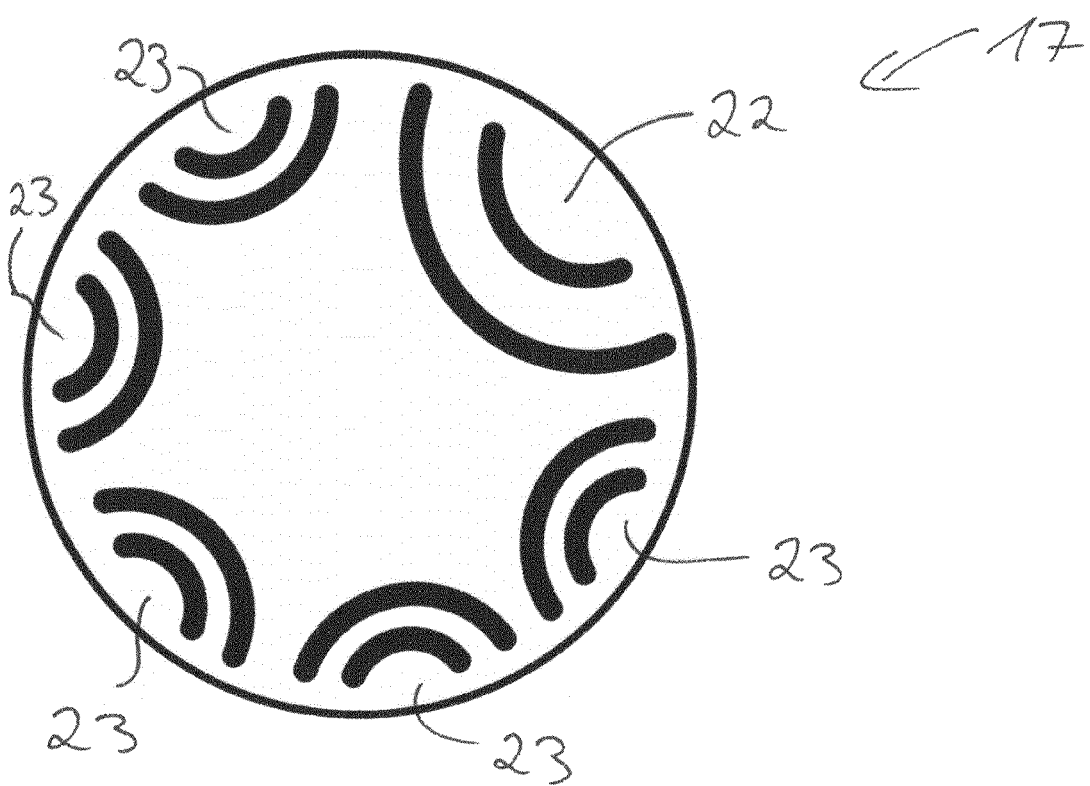

In FIGS. 3C and 3D cross sections through two exemplary embodiments of rotors are shown.

Figure 4A:
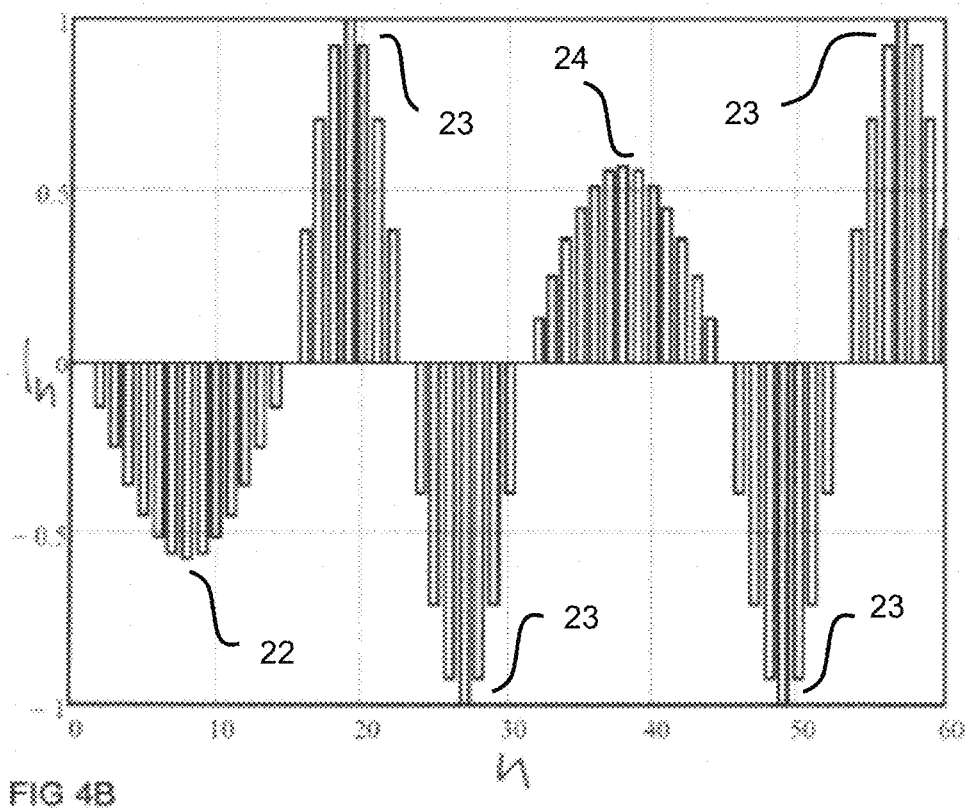
Figure 4B:
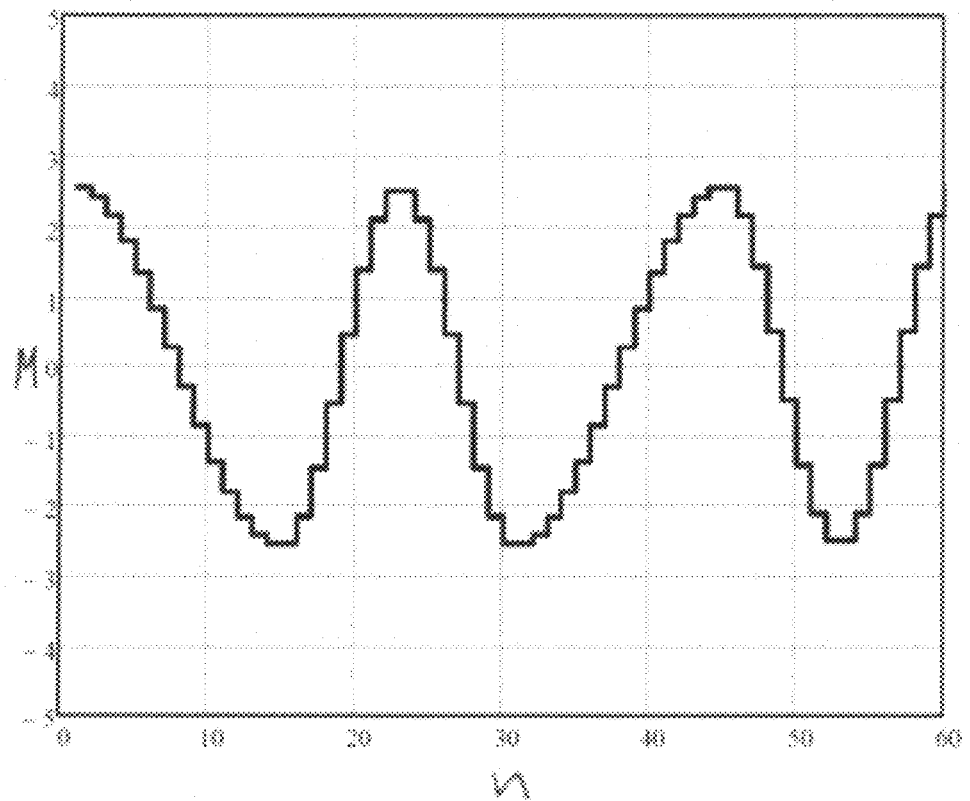

In FIGS. 4A and 4B exemplary phase currents and the resulting magneto motive force for another exemplary embodiment of the stator are shown.

Figure 4C:
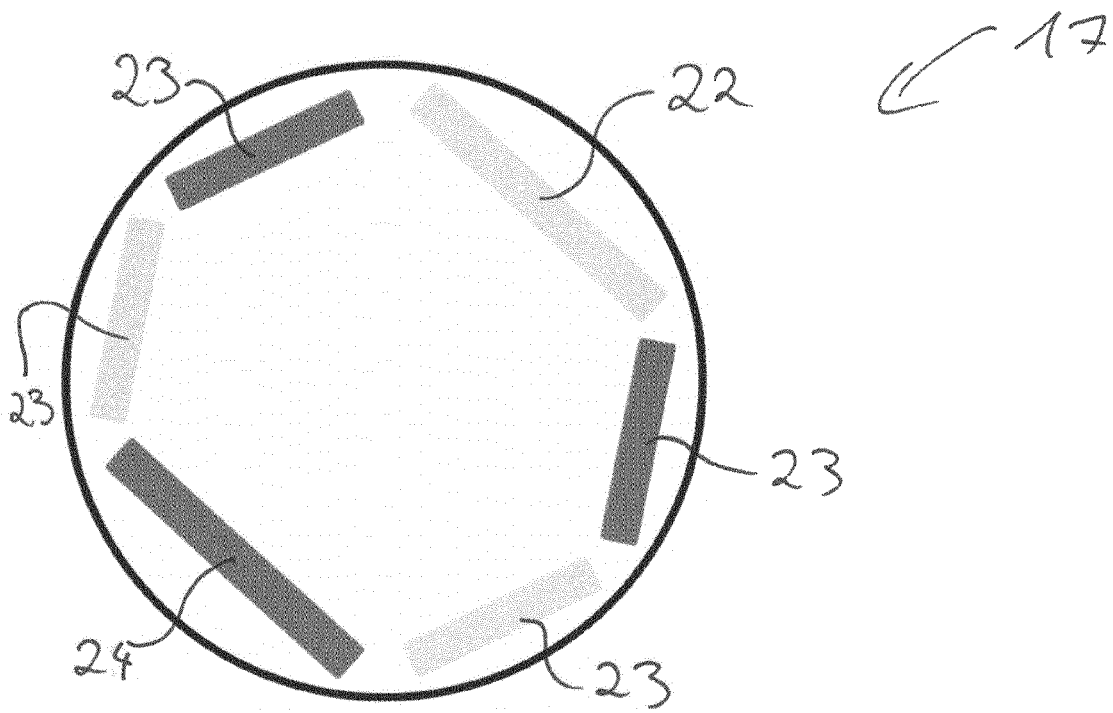
Figure 4D:
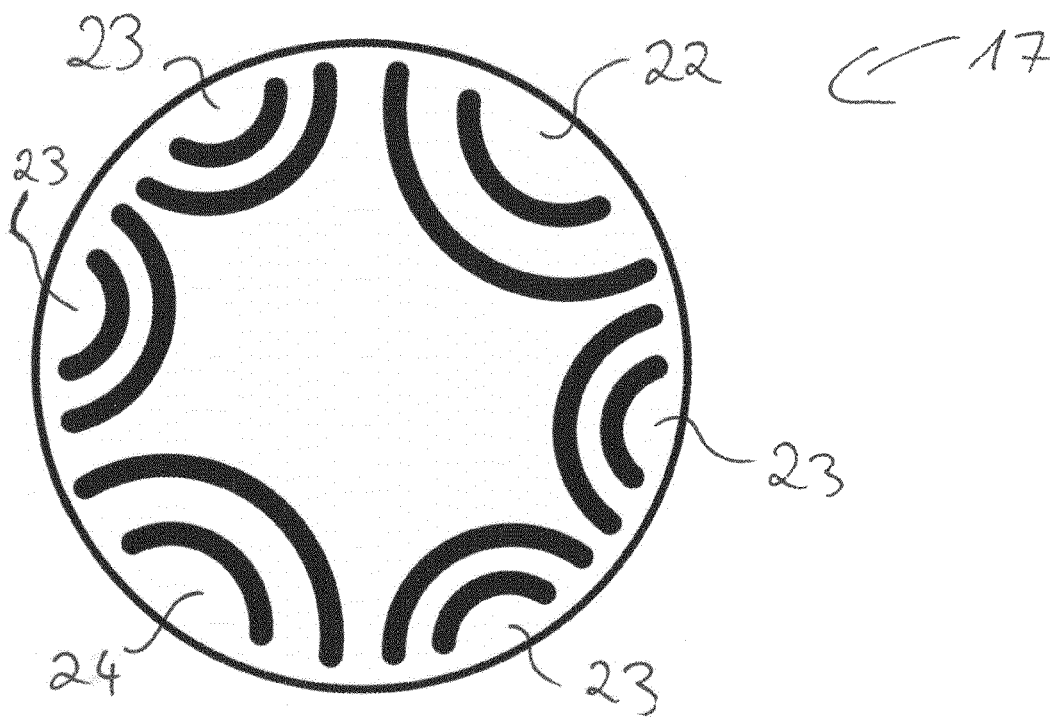

In FIGS. 4C and 4D cross sections through two further exemplary embodiments of the rotor are shown.

Figure 5A:
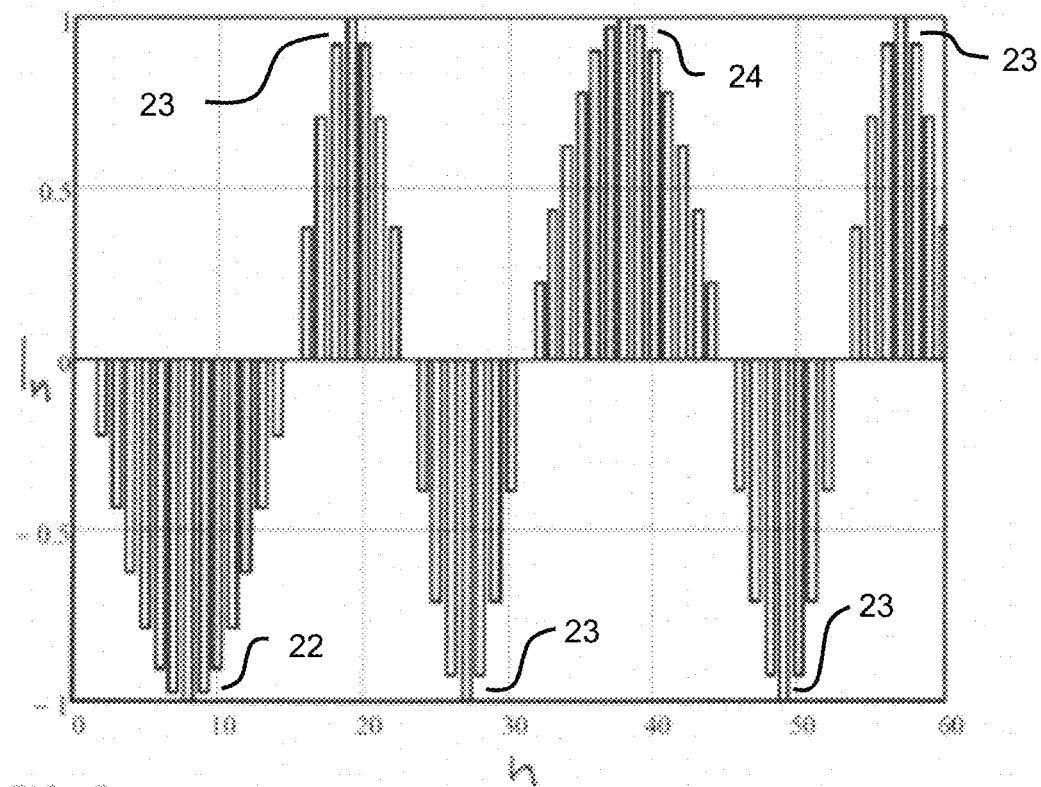
Figure 5B:
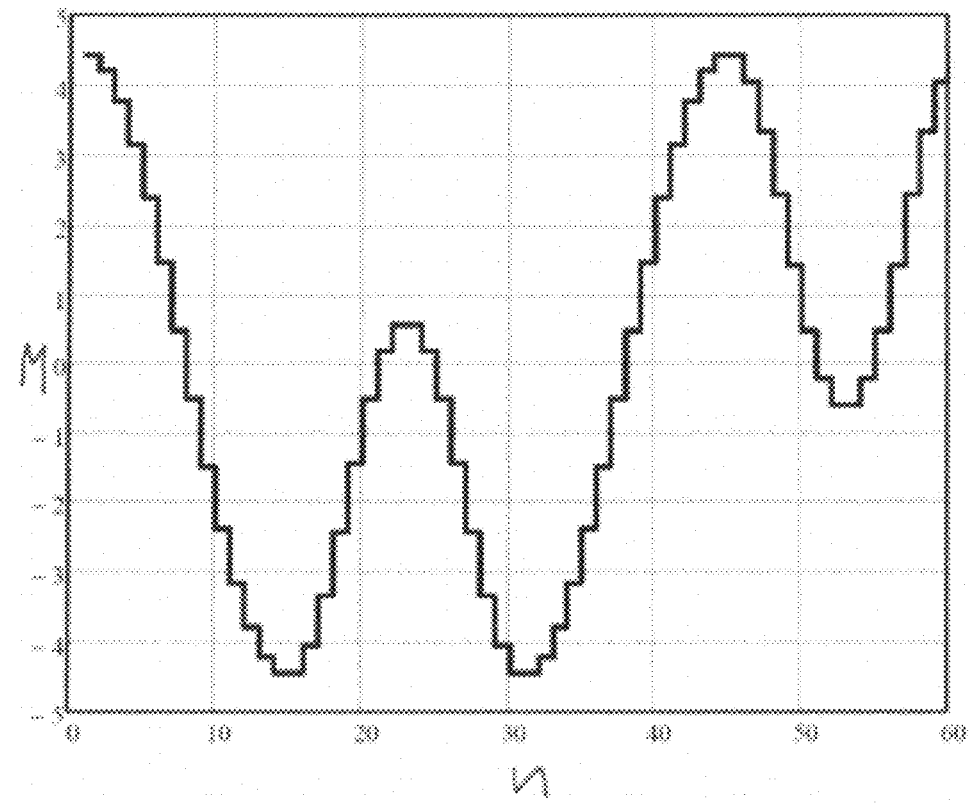

In FIGS. 5A and 5B exemplary phase currents and the resulting magneto motive force are shown for another exemplary embodiment of the stator.

Figure 6A:
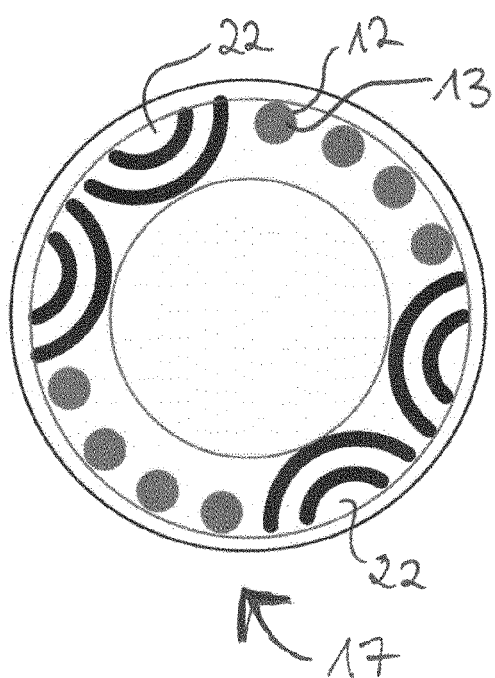
Figure 6B:
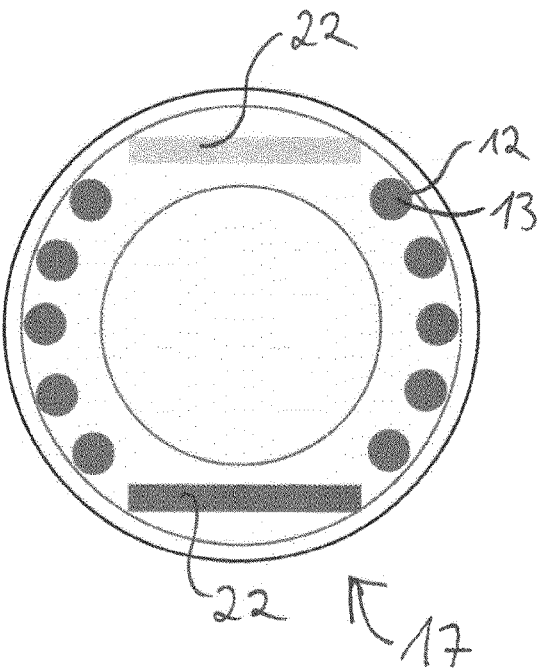
Figure 6C:
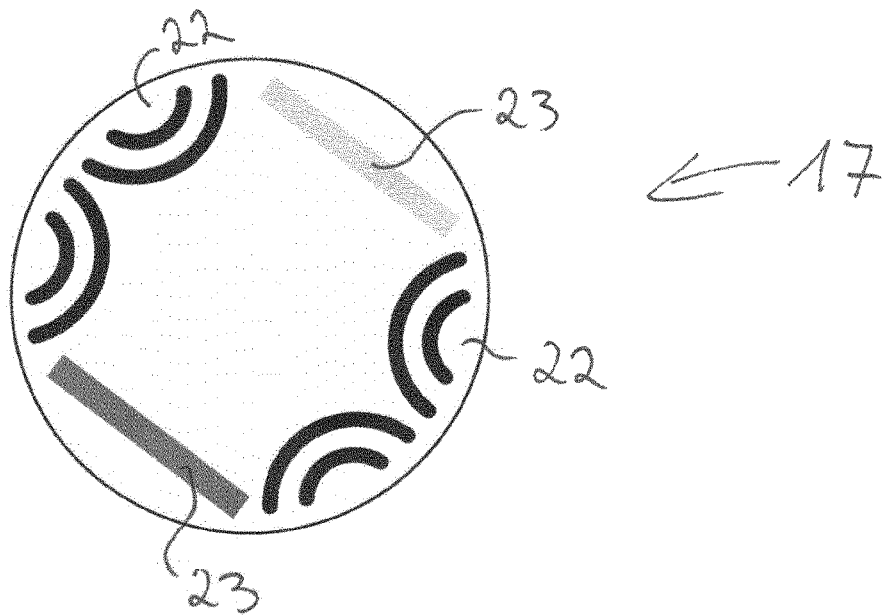

In FIGS. 6A to 6C cross sections through three further exemplary embodiments of the rotor are shown.

Figure 7A:
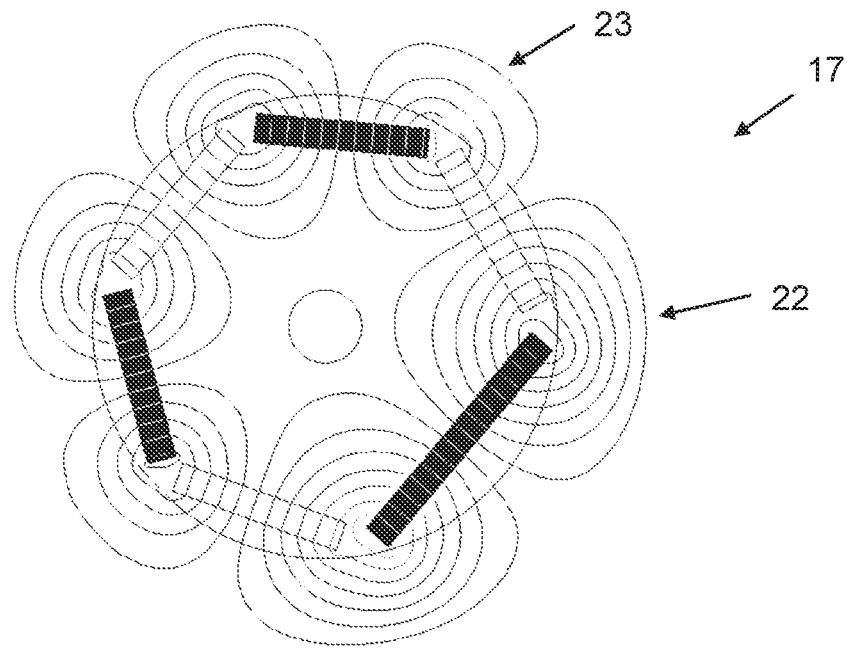

In FIG. 7A another exemplary embodiment of the rotor is shown.

Figure 7B:
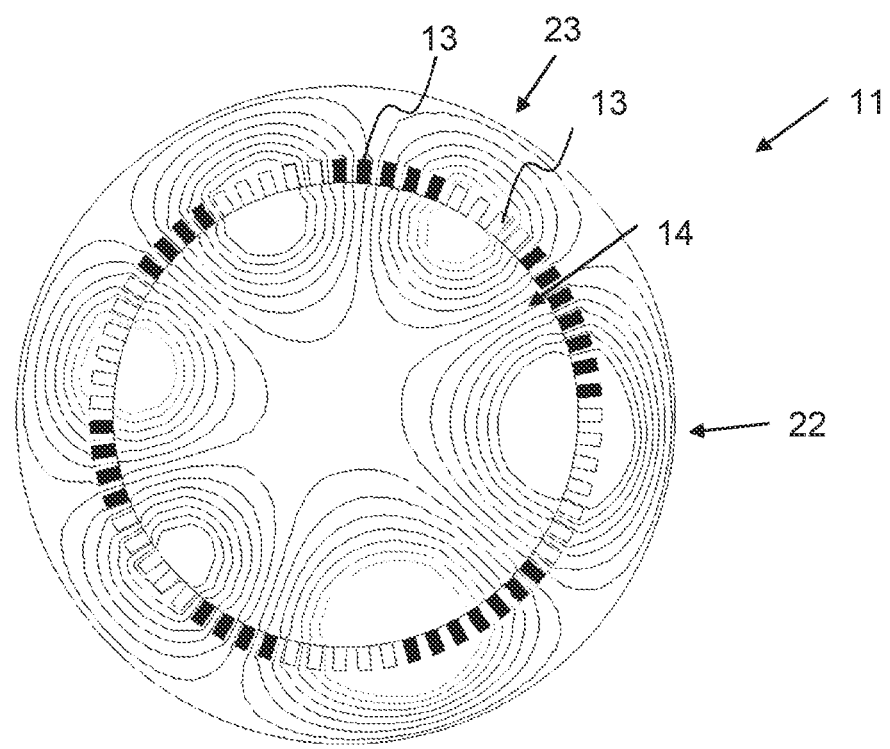

In FIG. 7B another exemplary embodiment of the stator is shown.

Figure 8A:
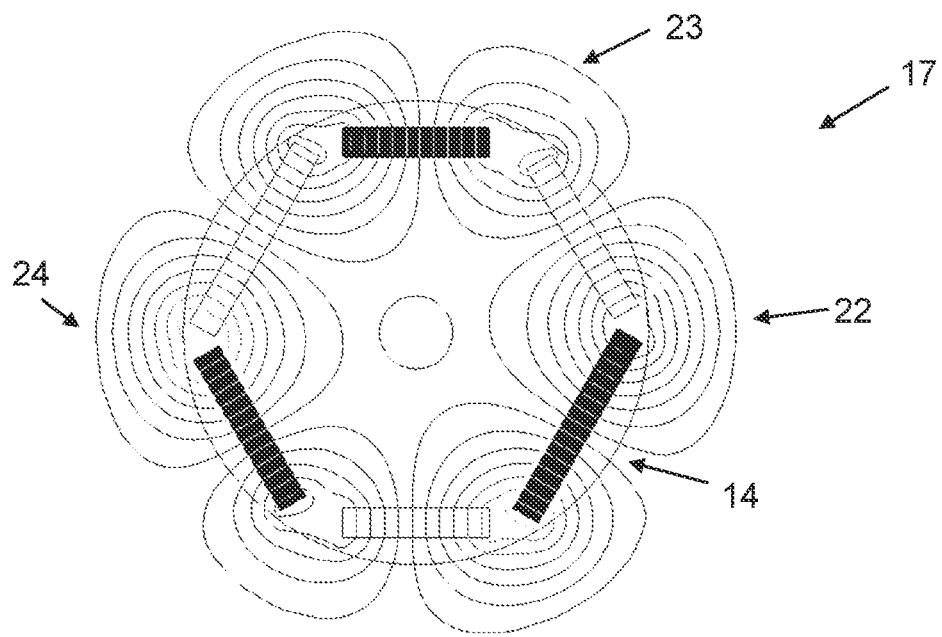

In FIG. 8A another exemplary embodiment of the rotor is shown.

Figure 8B:
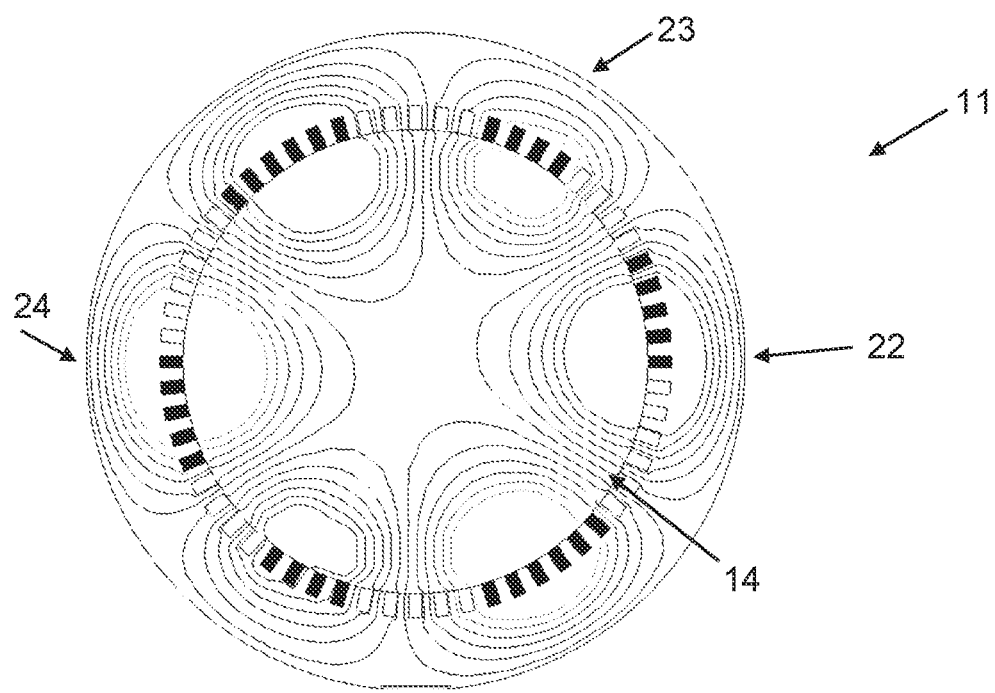

In FIG. 8B another exemplary embodiment of the stator is shown.

In FIG. 1A an exemplary embodiment of a stator 11 of an electric machine 10 is shown. The stator 11 comprises an iron stack 18 with at least one iron sheet in which slots 12 are inserted. In the slots 12 electrically conductive bars 13 are arranged. The bars 13 can for example comprise aluminum or copper. In this embodiment in each slot 12 one electrically conductive bar 13 is arranged. On a first side 19 of the stator 11 the bars 13 are electrically connected with each other by a short circuit ring 20. At a second side 21 of the stator 11 no short circuit ring 20 is arranged. The electrically conductive bars 13 in the slots 12 form an electrical winding 15 of the stator 11. The bars 13 can each be connected to a power supply 16 at the second side 21 of the stator 11.

In FIG. 1B an exemplary embodiment of the stator 11 which is connected to the power supply 16 is shown. At the second side 21 of the stator 11 the bars 13 are each connected to a terminal of the power supply 16. The current in the bars 13 can be controlled by the power supply 16 either individually or in groups. This means each bar 13 forms an electrical phase n and can be supplied with an individual phase current $I_n$ for each electrical phase n.

In this embodiment the bars 13 and also the slots 12 have a straight design and the slots 12 are parallel to each other. Furthermore, the slots 12 are arranged equidistant around the perimeter of the stator 11. Consequently, the production of the slots 12 and the bars 13 is simplified. A rotor 17 of the electric machine 10 can be arranged inside the stator 11. It is also possible that the rotor 17 of the electric machine 10 is arranged outside the stator 11. In both cases an air gap 14 is arranged between the stator 11 and the rotor 17.

In FIG. 2A the phase currents $I_n$ for a stator 11 with 60 bars 13 are shown. Each of the bars 13 is supplied with an individual phase current $I_n$ at the instant of time depicted in FIG. 2A. This means, the exemplary stator 11 comprises 60 electrical phases n. The phase currents $I_n$ are phase shifted towards each other and alternate with time. Thus, a rotating stator magnetic field is formed. The sum of all phase currents $I_n$ is zero in order to avoid leakage currents in the power supply. In this example the phase currents $I_n$ are phase shifted in such a way that six different poles of the stator magnetic field are formed. The circumferential extent of the poles of the stator magnetic field is in this case given by the circumferential extent of the bars 13 which contribute to the formation of the respective pole. The six different poles all comprise the same circumferential extent along the air gap 14.

In FIG. 2B the magneto motive force M along the air gap 14 is shown for the 60 bars 13. The magneto motive force M is generated by the phase currents $I_n$ of the stator 11. Therefore, the magneto motive force also alternates along the air gap 14. The magneto motive force M can exert torque on the rotor 17 which is arranged inside or outside the stator 11.

In FIG. 2C a cross section of a rotor 17 with buried permanent magnets is shown. The rotor 17 comprises six magnets which is why the rotor magnetic field comprises six poles 22, 23. Thus, the number of poles 22, 23 of the rotor magnetic field is given by the number of magnets of the rotor 17. In this case all magnets of the rotor 17 have the same size, consequently, all poles 22, 23 of the rotor magnetic field have the same angular extent.

In FIG. 2D a cross section through a rotor 17 which is a synchronous reluctance rotor is shown. The synchronous reluctance rotor is optimized for six magnetic poles 22, 23 which all have the same angular extent.

In FIG. 2E a cross section through the rotor 17 which is a squirrel cage rotor is shown. The rotor 17 comprises slots 12 in which electrically conductive bars 13 are arranged. The slots 12 are arranged equidistant around the perimeter of the rotor 17. Furthermore, the bars 13 can for example comprise aluminum or copper. In this embodiment in each slot 12 one electrically conductive bar 13 is arranged. On both sides of the rotor 17 the bars 13 are electrically connected with each other by a short circuit ring 20.

In FIG. 3A the phase currents $I_n$ for the stator 11 with 60 bars 13 and therefore 60 electrical phases n are shown. In this embodiment the stator magnetic field again comprises six poles, however, in this case the circumferential extent of a first pole 22 is different from the circumferential extent of the other poles which are referred to as second poles 23. The difference in the circumferential extents between the first pole 22 and the second poles 23 is achieved by forming the first pole 22 with a larger number of bars 13 than the second poles 23. This means, a larger number of bars 13 contributes to the formation of the first pole 22 than to the formation of each of the second poles 23. In order to keep the sum of the phase currents $I_n$ zero the maximum amplitude of the phase currents $I_n$ that contribute to the formation of the first pole 22 is smaller than the maximum amplitudes of the phase currents $I_n$ that contribute to the formation of the second poles 23.

Advantageously, the circumferential extents of the poles of the stator magnetic field can be changed by changing the phase currents $I_n$. It is also possible to change the number of poles of the stator magnetic field by changing the phase currents $I_n$. Therefore, it is possible to adapt the stator magnetic field in such a way that a rotor magnetic field of the rotor 17 of the electric machine 10 interacts with the stator magnetic field.

In FIG. 3B the magneto motive force M along the air gap 14 is shown for the stator 11 which is supplied with the phase currents $I_n$ shown in FIG. 3A. A rotor 17 with a rotor magnetic field where the magnetic poles exhibit the same angular extents as the poles of the stator magnetic field can move relative to the stator 11 during operation of the electric machine 10.

In FIG. 3C a cross section through an exemplary embodiment of the rotor 17 is shown where the angular extents of the poles of the rotor magnetic field are different from each other. The poles of the rotor magnetic field are formed by buried permanent magnets. One of the buried magnets is larger than the other five magnets. Therefore, the rotor magnetic field comprises a first pole 22 with an angular extent that is larger than the angular extents of the other poles, referred to as second poles 23. The rotor 17 depicted in FIG. 3C can be employed in an electric machine 10 with a stator 11 where the stator magnetic field is formed by the phase currents $I_n$ depicted in FIG. 3A. Since the angular extents of the poles of the stator magnetic field and the poles of the rotor magnetic field are equal the rotor 17 can rotate with a constant angular velocity during operation of the electric machine 10.

In FIG. 3D a cross section through another exemplary embodiment of the rotor 17 is shown. The rotor 17 is a synchronous reluctance rotor with six magnetic poles. Similar to the rotor 17 shown in FIG. 3C a first pole 22 of the rotor magnetic field comprises a larger angular extent than the other poles, referred to as second poles 23. Also this exemplary rotor 17 can be employed in an electric machine 10 with a stator 11 where the stator magnetic field is formed by the phase currents $I_n$ depicted in FIG. 3A.

In FIG. 4A the phase currents $I_n$ for a stator 11 with six poles of the stator magnetic field are depicted. In this embodiment a first pole 22 and a third pole 24 have the same circumferential extent along the air gap 14, where the circumferential extent of the first pole 22 and the third pole 24 is larger the than circumferential extent of the four second poles 23. Moreover, the first pole 22 and the third pole 24 are arranged symmetrically with respect to a center of a cross section through the stator 11.

In FIG. 4B the magneto motive force M along the air gap 14 is shown for the stator 11 which is supplied with the phase currents $I_n$ shown in FIG. 4A. A rotor 17 with a rotor magnetic field where for each pole of the stator magnetic field the rotor magnetic field comprises a pole with the same angular extent can move relative to the stator 11 during operation of the electric machine 10.

In FIG. 4C a cross section through a further exemplary embodiment of the rotor 17 is shown. The six magnetic poles of the rotor 17 are formed by buried permanent magnets where two of the magnets have a larger size than the other four magnets. The two magnets that have a larger size than the other magnets are arranged symmetrically with respect to the center of the rotor 17. This means, the rotor magnetic field comprises a first pole 22, four second poles 23 and a third pole 24, where the third pole 24 has the same circumferential extent along the air gap 14 as the first pole 22. Therefore, the rotor 17 depicted in FIG. 4C can interact with a stator magnetic field which is formed by the phase currents $I_n$ shown in FIG. 4A.

In FIG. 4D a cross section through a further exemplary embodiment of the rotor 17 is shown. The rotor 17 is a synchronous reluctance rotor which is optimized for six magnetic poles. Similar to the rotor 17 shown in FIG. 4C a first pole 22 and a third pole 24 of the rotor magnetic field comprise a larger angular extent than the four second poles 23. Also this exemplary rotor 17 can interact with the stator magnetic field which is formed by the phase currents $I_n$ shown in FIG. 4A.

In FIG. 5A the phase currents $I_n$ for a stator 11 with six poles is shown. Similarly to the case shown in FIG. 4A a first pole 22 and a third pole 24 have a larger circumferential extent along the air gap 14 than the four second poles 23. For all six poles the maximum amplitude of the phase currents $I_n$ is the same. As the first pole 22 and the third pole 24 are arranged symmetrically with respect to the center of a cross section through the stator 11 also in this case the sum of the phase currents $I_n$ amounts to zero. Thus, for each of the bars 13 which form the electrical phases n the maximum current amplitude can be exploited.

In FIG. 5B the magneto motive force M along the air gap 14 is shown for the stator 11 which is supplied with the phase currents $I_n$ shown in FIG. 5A. For any of the phase currents $I_n$ shown in FIGS. 2A, 3A, 4A and 5A and the respective magneto motive force M the rotor 17 can be a squirrel cage rotor since the number and the width of the magnetic poles of the rotor magnetic field are formed by induction from the stator magnetic field.

In FIG. 6A cross section through an exemplary embodiment of a rotor 17 is shown. The rotor 17 is formed by a combination of a synchronous reluctance rotor and a squirrel cage rotor. Four first poles 22 of the rotor magnetic field are formed by a part of a synchronous reluctance rotor and the rotor 17 further comprises eight slots 12 with electrically conductive bars 13. During operation of the electric machine 10 at least two second poles 23 of the rotor magnetic field can be formed by induction from the stator magnetic field. The first poles 22 and the slots 12 of the squirrel cage rotor are arranged symmetrically with respect to the center of the cross section through the rotor 17. This means the rotor 17 comprises a combination of a rotor for a synchronous electric machine and a rotor for an induction machine.

In FIG. 6B a cross section through another exemplary embodiment of a rotor 17 is shown. In this case the rotor 17 comprises two permanent magnets forming two first poles 22 and ten slots with electrically conductive bars 13 of a squirrel cage rotor. The first poles 22 and the slots 12 are arranged symmetrically with respect to the center of the cross section through the rotor 17.

In FIG. 6C a cross section through another exemplary embodiment of a rotor 17 is shown. The rotor 17 comprises parts of a synchronous reluctance rotor forming four first poles 22 and two permanent magnets forming two second poles 23. The poles of the rotor magnetic field are arranged symmetrically with respect to the center of the cross section through the rotor 17. However, it is also possible that the poles of the rotor magnetic field are not symmetric with respect to the center of the cross section through the rotor 17.

FIG. 7A shows a schematic cross section through another exemplary embodiment of the rotor 17. The rotor magnetic field is shown schematically. The rotor magnetic field comprises six poles that are depicted with concentric lines. The poles of the rotor magnetic field are formed by buried permanent magnets that are drawn as rectangles. One of the buried magnets is larger than the other five magnets. Therefore, the rotor magnetic field comprises a first pole 22 with an angular extent that is larger than the angular extent of a second pole 23.

FIG. 7B shows a schematic cross section through another exemplary embodiment of the stator 11. In the cross section the electrically conductive bars 13 are visible and distributed along the circumference of the stator 11 as shown in FIG. 1B. FIG. 7B shows that the electrically conductive bars 13 are controlled in groups by the power supply 16. The neighboring bars 13 of the same color belong to the same group. In this way, the stator magnetic field is formed. The stator magnetic field is shown schematically. The stator magnetic field comprises six poles that are depicted with concentric lines. The stator magnetic field comprises a first pole 22 with an angular extent that is larger than the angular extent of a second pole 23. Furthermore, FIGS. 7A and 7B show that the poles of the rotor magnetic field exhibit the same angular extents as the poles of the stator magnetic field in the air gap 14.

FIG. 8A shows a schematic cross section through another exemplary embodiment of the rotor 17. In comparison to FIG. 7A two of the buried magnets are larger than the other four magnets. Therefore, the rotor magnetic field comprises a first pole 22 with an angular extent that is larger than the angular extent of a second pole 23 and a third pole 24 which has the same circumferential extent along the air gap 14 as the first pole 22.

FIG. 8B shows a schematic cross section through another exemplary embodiment of the stator 11. In comparison to FIG. 7B the stator magnetic field additionally comprises a third pole 24 which has the same circumferential extent along the air gap 14 as the first pole 22 which has a larger extent than the second pole 23. Furthermore, FIGS. 8A and 8B show that the poles of the rotor magnetic field exhibit the same angular extents as the poles of the stator magnetic field in the air gap 14.

REFERENCE NUMERALS

10: electric machine
11: stator
12: slot
13: bar
14: air gap
15: winding
16: power supply
17: rotor
18: iron stack
19: first side
20: short circuit ring
21: second side
22: first pole
23: second pole
24: third pole
$I_n$: phase current
M: magneto motive force
n: electrical phase

The invention claimed is:

1. An electric machine, comprising:
a stator, which comprises at least two slots in which each at least one electrically conductive bar is arranged, respectively, where
the stator is adjacent to an air gap,
the at least two electrically conductive bars form an electric winding of the stator and are arranged to be supplied with a corresponding electrical phase (n), respectively, by a power supply, and
the stator is arranged in such a way that during operation of the electric machine a stator magnetic field with at least two magnetic poles is formed in the air gap, where at least a first pole has a circumferential extent along the air gap which is different from the circumferential extent of at least a second pole, where the air gap is arranged between the stator and a rotor which is mounted movable relative to the stator, and, during operation of the electric machine, a rotor magnetic field with magnetic poles is formed in the rotor where the poles of the rotor magnetic field exhibit the same angular extents as the poles of the stator magnetic field in the air gap where the angular extents refer to central angles of a cross section through the rotor.

2. The electric machine according to claim 1, where the at least two poles have a respective pole width which is equal to their circumferential extents along the air gap.

3. The electric machine according to claim 1, where the stator magnetic field is a rotating field.

4. The electric machine according to claim 1, which comprises at least one further slot in the stator, in which at least one further electrically conductive bar is arranged, where at least one third pole of the stator magnetic field has the same circumferential extent along the air gap as the first pole.

5. The electric machine according to claim 4, where the first and the third pole are arranged symmetrically with respect to a center of a cross section through the stator.

6. The electric machine according to claim 1, where the rotor is a squirrel cage rotor.

7. The electric machine according to claim 1, where the rotor is one of: a rotor with buried permanent magnets, a synchronous reluctance rotor, and an externally excited synchronous rotor.

8. The electric machine according to claim 1, where the rotor is a combination of at least two of:
a rotor with buried permanent magnets,
a synchronous reluctance rotor,
an externally excited synchronous rotor, and
a squirrel cage rotor.

9. The electric machine according to claim 1, where the stator magnetic field is formed by supplying the bars of the stator with a corresponding electrical phase (n) each during operation of the electric machine.

* * * * *